(12) United States Patent
Uchihara

(10) Patent No.: US 9,438,874 B2
(45) Date of Patent: Sep. 6, 2016

(54) IMAGE PROCESSING APPARATUS THAT IS CAPABLE OF CORRECTING COLOR SHIFT, METHOD OF CONTROLLING THE SAME, AND STORAGE MEDIUM

(71) Applicant: CANON KABUSHIKI KAISHA, Tokyo (JP)

(72) Inventor: Masato Uchihara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 14/464,335

(22) Filed: Aug. 20, 2014

(65) Prior Publication Data

US 2015/0054983 A1 Feb. 26, 2015

(30) Foreign Application Priority Data

Aug. 22, 2013 (JP) .................. 2013-172254

(51) Int. Cl.
*H04N 9/64* (2006.01)
*H04N 5/357* (2011.01)
*H04N 5/77* (2006.01)

(52) U.S. Cl.
CPC ............ *H04N 9/646* (2013.01); *H04N 5/3572* (2013.01); *H04N 5/772* (2013.01)

(58) Field of Classification Search
CPC .... H04N 5/357; H04N 5/3572; H04N 9/045; H04N 9/646; H04N 9/735
See application file for complete search history.

(56) References Cited

U.S. PATENT DOCUMENTS

| | | | |
|---|---|---|---|
| 8,531,579 B2 | 9/2013 | Sugimori | |
| 8,542,920 B2 | 9/2013 | Kano | |
| 8,730,357 B2 | 5/2014 | Nishio et al. | |

(Continued)

FOREIGN PATENT DOCUMENTS

| | | | |
|---|---|---|---|
| JP | 2004-120480 A | 4/2004 | |
| JP | 2008-015946 A | 1/2008 | |

(Continued)

OTHER PUBLICATIONS

Japanese Office Action issued in counterpart application No. JP2013-172254, dated Jan. 5, 2016.

*Primary Examiner* — Daniel M Pasiewicz
(74) *Attorney, Agent, or Firm* — Rossi, Kimms & McDowell LLP

(57) ABSTRACT

An image processing apparatus capable of highly accurately detecting and correcting color shift of image data, caused by a chromatic difference of magnification. The image processing apparatus stores first color shift amount data including color shift amount information of the image data and accuracy information indicative of detection accuracy of the color shift. The image processing apparatus analyzes the image data to thereby determine second color shift amount data including color shift amount information of the image data and accuracy information indicative of detection accuracy of the color shift. The image processing apparatus corrects the color shift of the image data using the color shift amount information selected from the first and color shift amount data, based on the accuracy information included in the first color shift amount data and the accuracy information included in the second color shift amount data.

16 Claims, 12 Drawing Sheets

(56) References Cited

U.S. PATENT DOCUMENTS

| | | | |
|---|---|---|---|
| 2005/0046695 A1* | 3/2005 | Takasugi | H04N 9/093 348/71 |
| 2006/0165442 A1* | 7/2006 | Kobayashi | G03G 15/1685 399/301 |
| 2007/0116375 A1* | 5/2007 | Utsugi | H04N 9/045 382/264 |
| 2008/0007630 A1 | 1/2008 | Hara | |
| 2008/0284869 A1 | 11/2008 | Utsugi | |
| 2011/0103686 A1* | 5/2011 | Kano | H04N 9/045 382/167 |
| 2012/0154626 A1* | 6/2012 | Hatakeyama | H04N 9/646 348/223.1 |
| 2014/0375864 A1* | 12/2014 | Miyagishima | G03B 13/06 348/333.09 |

FOREIGN PATENT DOCUMENTS

| | | |
|---|---|---|
| JP | 2012015781 A | 1/2012 |
| JP | 2012023532 A | 2/2012 |
| JP | 2012070053 A | 4/2012 |
| WO | 2007105359 A1 | 9/2007 |

* cited by examiner

| LENS ID | :095 | | | | |
|---|---|---|---|---|---|
| FOCAL DISTANCE | :135 | | | | |
| PHOTOGRAPHING DISTANCE | :500 | | | | |
| IMAGE HEIGHT | | a | b | c | d |
| COLOR SHIFT AMOUNT | | 0.30 | 0.90 | 1.30 | 1.60 |
| DETECTION ACCURACY | | 1.60 | 1.80 | 0.70 | 1.50 |

PROCESSING UNIT BLOCK

FIG. 6A

| B  | G1 | B  | G1 | B  |
|----|----|----|----|----|
| G2 | R  | G2 | R  | G2 |
| B  | G1 | B  | G1 | B  |
| G2 | R  | G2 | R  | G2 |
| B  | G1 | B  | G1 | B  |

FIG. 6B

|   |   |   |   |   |
|---|---|---|---|---|
|   |   | R |   | R |
|   |   |   |   |   |
|   |   | R |   | R |
|   |   |   |   |   |

FIG. 6C

|   | G |   | G |   |
|---|---|---|---|---|
| G |   | G |   | G |
|   | G |   | G |   |
| G |   | G |   | G |
|   | G |   | G |   |

FIG. 6D

| B |   | B |   | B |
|---|---|---|---|---|
|   |   |   |   |   |
| B |   | B |   | B |
|   |   |   |   |   |
| B |   | B |   | B |

FIG. 7

| 1 | 2 | 1 |
|---|---|---|
| 2 | 4 | 2 |
| 1 | 2 | 1 |

FIG. 9

| COLOR SHIFT AMOUNT | SECTION (a) | SECTION (b) | SECTION (c) | SECTION (d) |
|---|---|---|---|---|
| +1.0 | 0 | 0 | 0 | 1 |
| +0.9 | 0 | 1 | 11 | 11 |
| +0.8 | 0 | 2 | 21 | 21 |
| +0.7 | 0 | 18 | 43 | 4 |
| +0.6 | 1 | 24 | 17 | 2 |
| +0.5 | 2 | 7 | 7 | 0 |
| +0.4 | 3 | 3 | 0 | 0 |
| +0.3 | 4 | 0 | 0 | 0 |
| +0.2 | 3 | 0 | 0 | 0 |
| +0.1 | 1 | 0 | 0 | 0 |
| +0 | 0 | 0 | 0 | 0 |
| -0.1 | 0 | 0 | 0 | 0 |
| -0.2 | 0 | 0 | 0 | 0 |
| -0.3 | 0 | 0 | 0 | 0 |
| -0.4 | 0 | 0 | 0 | 0 |
| -0.5 | 0 | 0 | 0 | 0 |
| -0.6 | 0 | 0 | 0 | 0 |
| -0.7 | 0 | 0 | 0 | 0 |
| -0.8 | 0 | 0 | 0 | 0 |
| -0.9 | 0 | 0 | 0 | 0 |
| -1.0 | 0 | 0 | 0 | 0 |
| DETECTION COUNT | 14 | 60 | 100 | 39 |
| TOTAL VALUE | 4.7 | 37.0 | 73.2 | 34.5 |
| AVERAGE VALUE | 0.3 | 0.6 | 0.7 | 0.8 |

FIG. 11A

FIRST COLOR SHIFT AMOUNT DATA

| IMAGE HEIGHT | a | b | c | d |
|---|---|---|---|---|
| COLOR SHIFT AMOUNT | 0.75 | 0.90 | 0.130 | 1.60 |
| DETECTION ACCURACY | 1.60 | 1.80 | 0.70 | 1.50 |

FIG. 11B

SECOND COLOR SHIFT AMOUNT DATA

| IMAGE HEIGHT | a | b | c | d |
|---|---|---|---|---|
| COLOR SHIFT AMOUNT | 0.50 | 1.00 | 1.40 | 2.50 |
| DETECTION ACCURACY | 1.30 | 1.50 | 1.20 | 1.40 |

FIG. 11C

THIRD COLOR SHIFT AMOUNT DATA

| IMAGE HEIGHT | a | b | c | d |
|---|---|---|---|---|
| COLOR SHIFT AMOUNT | 0.75 | 0.90 | 1.40 | 1.60 |
| DETECTION ACCURACY | 1.60 | 1.80 | 1.20 | 1.50 |

FIG. 15

| COLOR SHIFT AMOUNT | SECTION (a) | SECTION (b) | SECTION (c) | SECTION (d) |
|---|---|---|---|---|
| +1.0 | 0 | 0 | 0 | 0 |
| +0.9 | 0 | 0 | 0 | 0 |
| +0.8 | 0 | 0 | 0 | 600 |
| +0.7 | 0 | 0 | 1200 | 0 |
| +0.6 | 0 | 800 | 0 | 0 |
| +0.5 | 0 | 0 | 0 | 0 |
| +0.4 | 0 | 0 | 0 | 0 |
| +0.3 | 400 | 0 | 0 | 0 |
| +0.2 | 0 | 0 | 0 | 0 |
| +0.1 | 0 | 0 | 0 | 0 |
| +0 | 0 | 0 | 0 | 0 |
| -0.1 | 0 | 0 | 0 | 0 |
| -0.2 | 0 | 0 | 0 | 0 |
| -0.3 | 0 | 0 | 0 | 0 |
| -0.4 | 0 | 0 | 0 | 0 |
| -0.5 | 0 | 0 | 0 | 0 |
| -0.6 | 0 | 0 | 0 | 0 |
| -0.7 | 0 | 0 | 0 | 0 |
| -0.8 | 0 | 0 | 0 | 0 |
| -0.9 | 0 | 0 | 0 | 0 |
| -1.0 | 0 | 0 | 0 | 0 |
| DETECTION COUNT | 400 | 800 | 1200 | 600 |
| TOTAL VALUE | 120 | 480 | 840 | 480 |
| AVERAGE VALUE | 0.3 | 0.6 | 0.7 | 0.8 |

IMAGE PROCESSING APPARATUS THAT IS CAPABLE OF CORRECTING COLOR SHIFT, METHOD OF CONTROLLING THE SAME, AND STORAGE MEDIUM

BACKGROUND OF THE INVENTION

1. Field of the Invention

The present invention relates to an image processing apparatus that is capable of correcting color shift of an image obtained through photographing, a method of controlling the image processing apparatus, and a storage medium.

2. Description of the Related Art

In general, an image pickup apparatus, such as a digital camera, is equipped with an image processing apparatus for correcting color shift caused by a chromatic difference of magnification which is generated in an image obtained through photographing (also referred to as a photographed image"). To correct color shift, there has been proposed an image processing apparatus which is configured to correct a photographed image by shifting the phase of an R (red) or a B (blue) signal with respect to a G signal by a color shift amount determined according to a predetermined design value (see Japanese Patent Laid-Open Publication No. 2008-15946).

Further, there has also been proposed an image processing apparatus which is configured to detect a color shift amount used for correction of color shift from feature points (mainly, edge portions) of a photographed image. For example, there has been proposed an image processing apparatus which is configured to evaluate reliability of results of detection of color shift amounts in the feature points according to the number of detected feature points, detection variation thereof, and detected image heights, and when the reliability is low, occurrence of an error is prevented by using a color shift amount calculated based on an approximate curve low in the degree of freedom determined by performing curve fitting on the results of detection of color shift amounts (see International Publication No. WO-2007-105359 (Japanese Patent Application No. 2008-504985)).

Further, there has been proposed an image processing apparatus which is configured to correct a plurality of photographed images according to an average value of color shift amounts calculated from the plurality of photographed images which are estimated to have the same chromatic difference of magnification, to thereby improve correction accuracy compared with a case where color shift amounts are calculated from a single photographed image (see Japanese Patent Laid-Open Publication No. 2004-120480).

However, in the method proposed in Japanese Patent Laid-Open Publication No. 2008-15946, when there is a lens manufacturing error or a difference between individual lenses, there occurs a difference between the color shift amount based on the predetermined design value and an actual color shift amount.

Further, in the methods proposed in International Publication No. WO-2007-105359 (Japanese Patent Application No. 2008-504985), and Japanese Patent Laid-Open Publication No. 2004-120480, since color shift amounts are calculated from a photographed image, correction accuracy is not degraded by the lens manufacturing error or the difference between individual lenses. However, if the photographed image is not in a state allowing proper detection of the color shift amounts, the detection and correction accuracy thereof are changed. In the method proposed in International Publication No. WO-2007-105359 (Japanese Patent Application No. 2008-504985), whenever an image is photographed, color shift correction is performed using only color shift amounts detected from the one photographed image, so that if the reliability of the detected color shift amounts is low, the accuracy of the color shift correction is inevitably degraded.

Further, in the method proposed in Japanese Patent Laid-Open Publication No. 2004-120480, a plurality of images photographed under the same photographing conditions are collectively processed for detecting and correcting color shift amounts thereof, and hence unless a plurality of photographed images remain or stored in the image pickup apparatus, it is impossible to perform the color shift correction processing.

SUMMARY OF THE INVENTION

The present invention provides an image processing apparatus that is capable of highly accurately detecting and correcting color shift caused by a chromatic difference of magnification, a method of controlling the image processing apparatus, and a storage medium.

In a first aspect of the present invention, there is provided an image processing apparatus that corrects color shift caused by chromatic difference of magnification in image data determined based on an optical image incident through an optical system, comprising a storage unit configured to store first color shift amount data including color shift amount information of the image data and accuracy information indicative of detection accuracy of the color shift, an analysis unit configured to analyze the image data and thereby determine second color shift amount data including color shift amount information of the image data and accuracy information indicative of detection accuracy of the color shift, and a correction unit configured to correct the color shift of the image data using the color shift amount information selected from the first color shift amount data and the second color shift amount data, based on the accuracy information included in the first color shift amount data read out from said storage unit and the accuracy information included in the second color shift amount data determined by said analysis unit.

In a second aspect of the present invention, there is provided a method of controlling an image processing apparatus that corrects color shift caused by chromatic difference of magnification in image data determined based on an optical image incident through an optical system, comprising storing first color shift amount data including color shift amount information of the image data and accuracy information indicative of detection accuracy of the color shift, analyzing the image data and thereby determining second color shift amount data including color shift amount information of the image data and accuracy information indicative of detection accuracy of the color shift, and correcting the color shift of the image data using the color shift amount information selected from the first color shift amount data and the second color shift amount data, based on the accuracy information included in the first color shift amount data and the accuracy information included in the second color shift amount data determined by said analyzing.

In a third aspect of the present invention, there is provided a non-transitory computer-readable storage medium storing a computer-executable control program for causing a computer to execute a method of controlling an image processing apparatus that corrects color shift caused by chromatic difference of magnification in image data determined based on an optical image incident through an optical system, wherein the method comprises storing first color shift amount data including color shift amount information of the image data and accuracy information indicative of detection accuracy of the color shift, analyzing the image data and thereby determining second color shift amount data including color shift amount information of the image data and accuracy information indicative of detection accuracy of the color shift, and correcting the color shift of the image data using the color shift amount information selected from the first color shift amount data and the second color shift amount data, based on the accuracy information included in the first color shift amount data and the accuracy information included in the second color shift amount data determined by said analyzing.

According to the present invention, it is possible to accurately detect and correct color shift caused by a chromatic difference of magnification.

Further features of the present invention will become apparent from the following description of exemplary embodiments (with reference to the attached drawings).

BRIEF DESCRIPTION OF THE DRAWINGS

FIGS. 6A to 6D are diagrams useful in explaining a process for extracting color data items from image data obtained from pixels in a Bayer array of an image pickup device appearing in FIG. 1.

FIG. 7 is a diagram of an example of a filter which is used during pixel interpolation executed by a photographed image analysis section appearing in FIG. 2.

FIG. 9 is a diagram showing an example of a result of detection of color shift amounts in each processing unit block, stored in a local memory appearing in FIG. 2.

FIGS. 11A to 11C are diagrams useful in explaining color shift amount correction executed by a color shift amount correction section appearing in FIG. 2.

FIG. 15 is a diagram useful in explaining color shift amount design value data used in a digital camera as an image pickup apparatus including an image processing apparatus according to a fifth embodiment of the present invention.

DESCRIPTION OF THE EMBODIMENTS

The present invention will now be described in detail below with reference to the accompanying drawings showing embodiments thereof.

Figure 1:
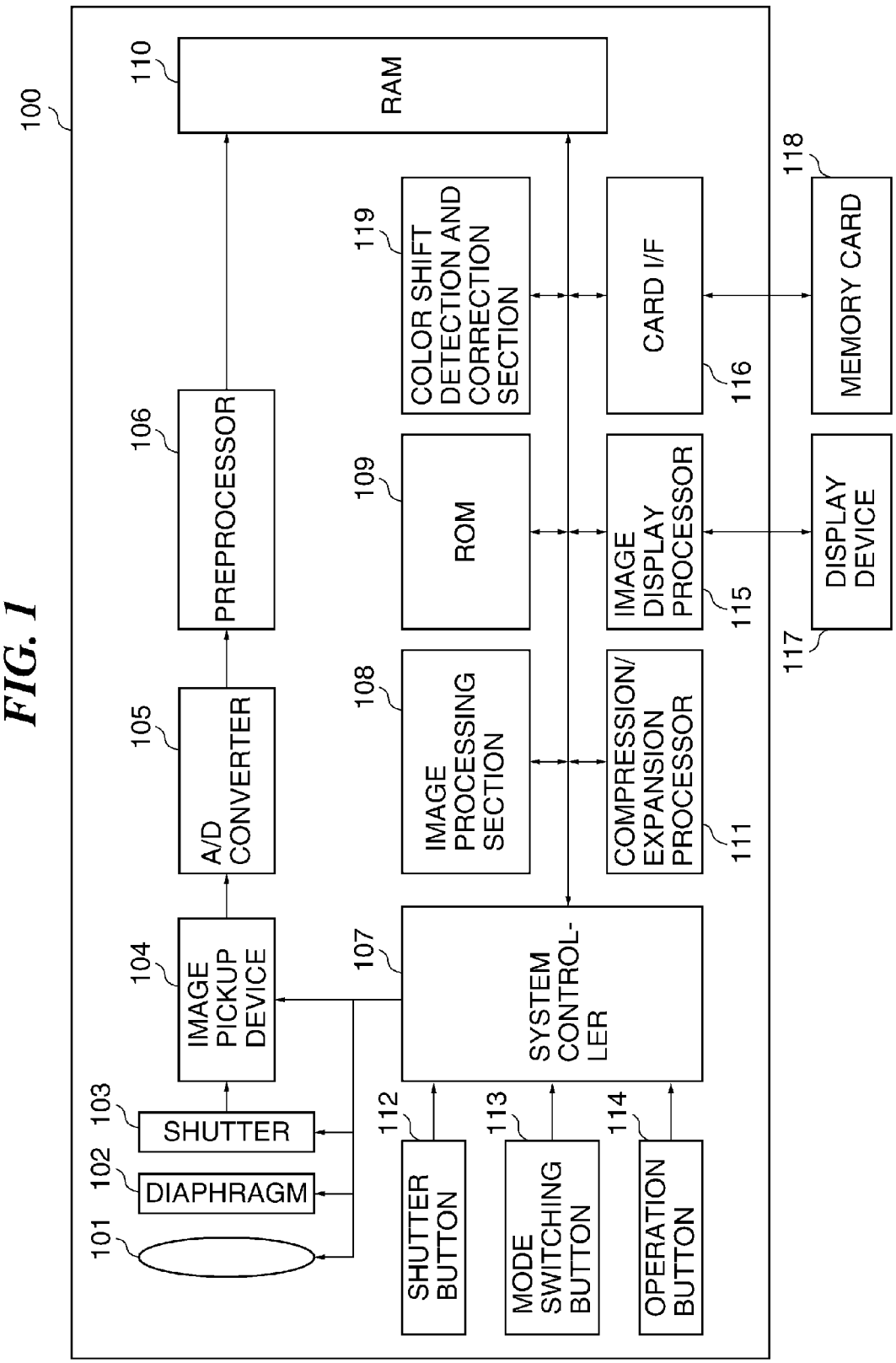
FIG. 1 is a block diagram of a digital camera as an image pickup apparatus including an image processing apparatus according to a first embodiment of the present invention.

FIG. 1 is a block diagram of an image pickup apparatus including an image processing apparatus according to a first embodiment of the present invention.

The image pickup apparatus 100 shown in FIG. 1 is e.g. a digital camera (hereinafter simply referred to as the "camera"), and includes a photographing lens unit (hereinafter simply referred to as the "photographing lens") 101. The photographing lens 101 is a lens group (optical system) including a zoom lens and a focus lens, and a diaphragm 102 and a shutter 103 are arranged downstream of the photographing lens 101. An optical image (object image) having passed through the photographing lens 101 is formed on an image pickup device 104 via the diaphragm 102 and the shutter 103.

The diaphragm 102 is used for adjusting an incident light amount on the image pickup device 104. The shutter 103 is used for adjusting the exposure time of the image pickup device 104. The image pickup device 104 is e.g. a CCD (charged coupled device) image sensor or a CMOS (complementary metal oxide semiconductor) image sensor, and generates an electric signal (analog signal) according to an optical image incident from the photographing lens 101. The image pickup device 104 can change the sensitivity of the CCD image sensor or the CMOS image sensor under the control of a system controller 107.

Note that disposed on the front side of the image pickup device 104 are color filters (not shown) for separating incident light (optical image) into color components of the colors of R (red), G (green), and B (blue), and thereafter causing image formation on the image pickup device 104. A Bayer array, described hereinafter, is used for associating the color filters with pixels of the image pickup device 104.

An analog signal as an output from the image pickup device 104 is input to an analog-to-digital converter 105, and is converted to a digital signal by the analog-to-digital converter 105. Then, a preprocessor 106 processes the digital signal output from the analog-to-digital converter 105 for resizing, such as predetermined pixel interpolation and size reduction, and color conversion, to thereby generate image data, and writes the generated image data in a RAM 110.

The RAM 110 is a system memory, and stores image data output from the preprocessor 106 as described above (hereinafter referred to as the "RAW image data"). Further, constants and variables for use in operation of the system controller 107, programs read from a ROM 109 (storage unit), and so forth are loaded into the RAM 110.

The ROM 109 is a memory, such as an EEPROM, which is capable of performing electrical deletion and recording, and stores the constants, the programs, etc., for use in operation of the system controller 107. Further, data used for correcting color shift (hereinafter referred to as the "color shift amount data") is stored in the ROM 109.

The system controller 107 controls the overall operation of the camera 100 according to each program loaded into the RAM 110. More specifically, the system controller 107 is e.g. a CPU, and controls operation of each block of the image processing apparatus by loading an operation program for the block from the ROM 109 into the RAM 110, and executing the operation program. To acquire the RAW image data, the system controller 107 controls an in-focus position and an exposure amount by controlling the photographing lens 101, the diaphragm 102, the shutter 103, and the image pickup device 104. After acquisition of the RAW image data, the system controller 107 controls a color shift detection and correction section 119 to thereby perform a color shift detection and correction process of the RAW image data stored in the RAM 110.

Figure 2:
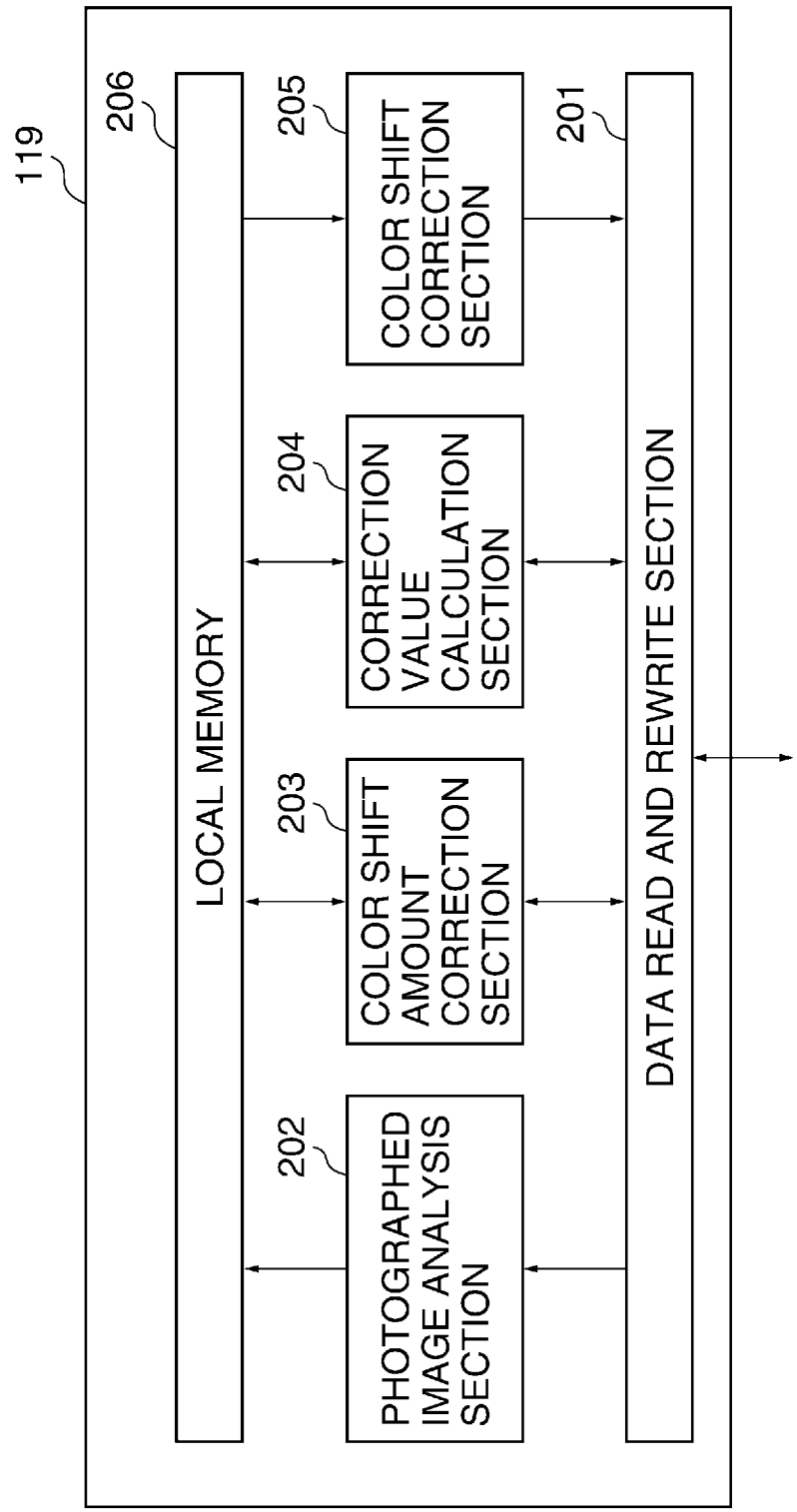
FIG. 2 is a block diagram of a color shift detection and correction section appearing in FIG. 1.

FIG. 2 is a block diagram of the color shift detection and correction section 119 shown in FIG. 1.

The color shift detection and correction section 119 has a data read and rewrite section 201. The data read and rewrite section 201 controls data transfer between the RAM 110 and each module of the color shift detection and correction section 119. A local memory 206 temporarily stores image data. A photographed image analysis section 202 analyzes the RAW image data stored in the RAM 110, and detects color shift amounts thereof.

A color shift amount correction section 203 corrects the color shift amount data read out from the ROM 109 into the local memory 206 by using data of the detected color shift amounts. A correction value calculation section 204 calculates a correction curve (i.e. correction values) used for color shift correction. A color shift correction section 205 corrects the color shift of the RAW image data using the correction values. The color shift detection and correction process will be described in detail, hereinafter.

Referring again to FIG. 1, after completion of the color shift correction process, the system controller 107 controls an image processor 108 to perform image processing, such as development processing and noise reduction processing, on the RAW image data of which the color shift has been corrected. Further, the system controller 107 controls a compression/expansion processor 111 to perform data compression processing on the RAW image data having been subjected to the image processing. Then, the system controller 107 controls a card interface 116 to write the image data which has been subjected to the compression processing (compressed image data) in the memory card 118.

For playback of the image, the system controller 107 controls the card interface 116 and the compression/expansion processor 111 to load the compressed image data from the memory card 118 into the RAM 110 and expand the image data. Then, an image display processor 115 displays an image based on the expanded image data on a display device 117 under the control of the system controller 107.

A photographing instruction is given to the system controller 107 in response to an operation of a shutter button 112 by a user. The system controller 107 starts an image pickup preparation operation, such as exposure control and ranging control, by half depression of the shutter button 112. Further, by full depression of the shutter button 112, the system controller 107 starts a series of photographing operations from reading a signal output from the image pickup device 104 to writing image data in the memory card 118.

A mode switching button 113 is used to switch an operation mode of the camera 100. The user can select e.g. a still image photographing mode or an image playback mode by using the mode switching button 113. An operation button 114 is used to perform e.g. exposure adjustment in the still image photographing mode, a change in the recording size of image data, and on or off setting of detection and correction of a chromatic difference of magnification.

Figure 3:
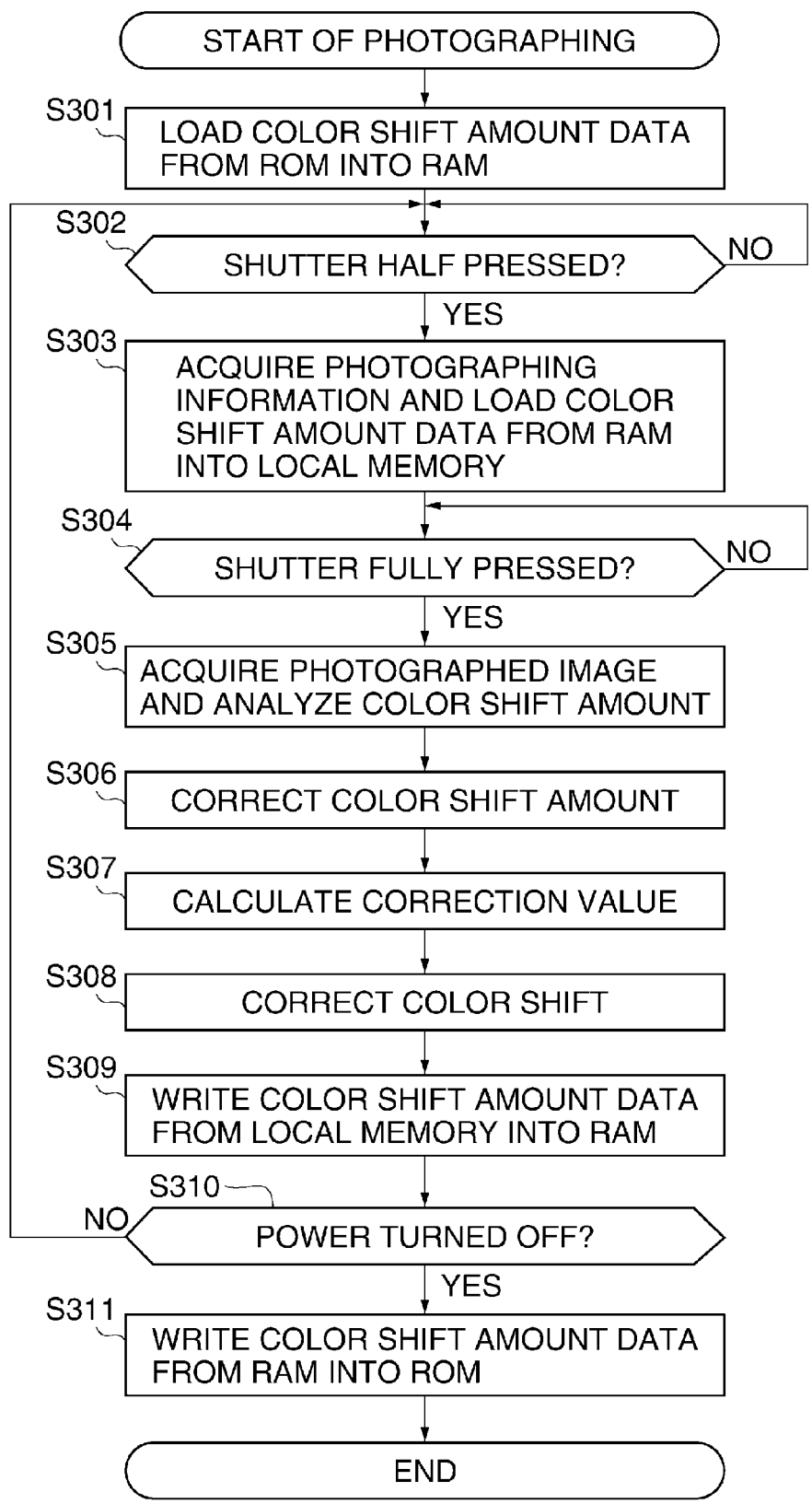
FIG. 3 is a flowchart of a color shift detection and correction process executed by the digital camera shown in FIG. 1.

FIG. 3 is a flowchart of the color shift detection and correction process executed by the camera 100 shown in FIG. 1. Note that the color shift detection and correction process shown in FIG. 3 is executed under the control of the system controller 107, i.e. the CPU.

When the camera 100 is stared, the system controller 107 reads out color shift amount data calculated based on past photographed images stored in the ROM 109 (hereinafter referred to as "first color shift amount data"), and loads the color shift amount data into the RAM 110 (step S301).

Figures 4, 5:
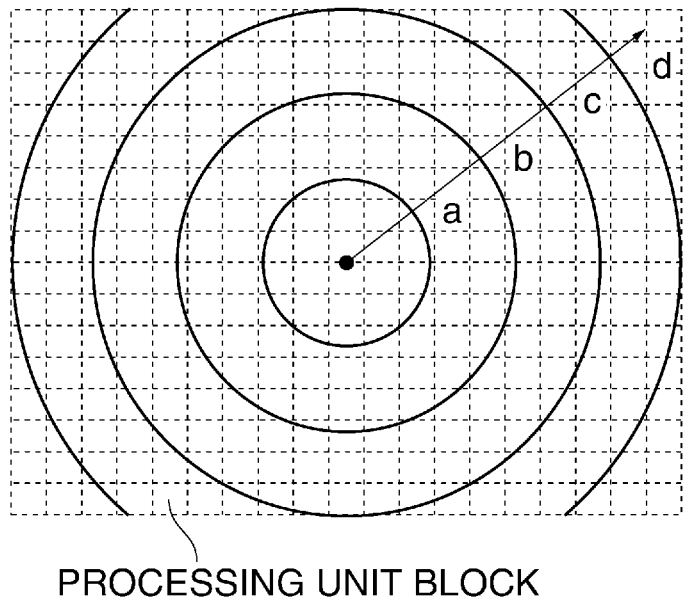
FIG. 4 is a diagram of an example of color shift amount data stored in a ROM appearing in FIG. 1.
FIG. 5 is a diagram useful in explaining image heights shown in FIG. 4.

FIG. 4 is a diagram of an example of the color shift amount data stored in the ROM 109 shown in FIG. 1.

As shown in FIG. 4, the color shift amount data includes a lens ID of the photographing lens 101, a focal length, a photographing distance, a color shift amount and accuracy information indicative of detection accuracy of the color shift amount at each of image heights, and like other parameters. The lens ID is an identifier for identifying the type of the photographing lens 101 (interchangeable lens) attached to the camera 100. When the lens ID cannot be identified, all of the color shift amounts and the accuracy information indicative of detection accuracy are made invalid.

The focal length is a parameter indicative of a distance (in units of millimeters) from the principal point of the photographing lens 101 to the image-forming plane of the image pickup device 104. Further, the photographing distance is a parameter indicative of a distance (in units of centimeters) from the principal point of the photographing lens 101 to an object which is focused by the photographing lens 101.

FIG. 5 is a diagram useful in explaining the image heights appearing in FIG. 4.

Referring to FIG. 5, each of the image heights "a" to "d" indicates an image area concentrically divided according to the distance from the central portion of an image (hereinafter referred to the "image height-based divided section"). The image height-based divided sections are each divided into a plurality of processing unit blocks, as described hereinafter. The number of the image height-based divided sections depends on the size of an image, target accuracy of color shift detection, and the capacity of the local memory 206.

Referring again to FIG. 4, the color shift amount and the detection accuracy are parameters indicative of a color shift amount (in units of pixels) detected in each of the image height-based divided sections, and the detection accuracy of the color shift amount, respectively. When the camera starts to be used, or it is in a state in which past image data is reset (state in which image data recorded e.g. in a memory provided in the camera is deleted), the values of both the color shift amount and the detection accuracy are equal to 0. The color shift amount caused by the chromatic difference of magnification varies with the focal length and the photographing distance even in the same photographing lens 101, and hence for a zoom lens, for example, it is necessary to manage the color shift amount and the detection accuracy according to a combination of the focal length and the photographing distance.

Referring again to FIG. 3, the system controller 107 determines whether or not the shutter button 112 has been half pressed (step S302). If the shutter button 112 has not been not half pressed (NO to the step S302), the system controller 107 waits.

On the other hand, if the shutter button 112 has been half pressed (YES to the step S302), the photographed image analysis section 202 acquires photographing information from the system controller 107 via the data read and rewrite section 201 under the control of the system controller 107. This photographing information includes lens information (lens ID), a zoom position of the zoom lens, and so forth.

Then, the photographed image analysis section 202 reads out first color shift amount data associated with the photographing information from the RAM 110, and loads the first color shift amount data into the local memory 206 (step S303).

Then, the system controller 107 determines whether or not the shutter button 112 has been fully pressed (step S304). If the shutter button 112 has not been fully pressed (NO to the step S304), the system controller 107 waits.

If the shutter button 112 has been fully pressed (YES to the step S304), the photographed image analysis section 202 performs color shift amount calculation and color shift detection accuracy calculation under the control of the system controller 107 (step S305: color shift amount analysis). More specifically, the photographed image analysis section 202 sequentially reads out RAW image data obtained through photographing and stored in the RAM 110, horizontally from the upper left of the screen, for each of processing unit blocks shown in FIG. 5, and calculates the color shift amount and the color shift detection accuracy on a processing unit block-by-processing unit block basis.

FIGS. 6A to 6D are diagrams useful in explaining a process for extracting color data items from image data obtained from pixels in a Bayer array of the image pickup device 104 shown in FIG. 1, in which FIG. 6A is a diagram of the image data in the Bayer array, FIG. 6B is a diagram of image data of R. Further, FIG. 6C is a diagram of image data of G, and FIG. 6D is a diagram of image data of B.

When executing the color shift amount analysis, the photographed image analysis section 202 extracts the respective image data items of the colors R, G, and B shown in FIGS. 6B to 6D, from the image data in the Bayer array shown in FIG. 6A.

The photographed image analysis section 202 performs interpolation processing on portions, with no pixel values, of the image data items of the colors R, G, and B shown in FIGS. 6B to 6D, using a filter shown in FIG. 7, to thereby generate R, G, and B plane data items.

Then, the photographed image analysis section 202 detects an edge of the image by generating a luminance (Y) plane data item, according to pixel values of the R, G, and B plane data items, using the following equation (1):

$$Y = 0.3 \times R + 0.6 \times G + 0.1 \times B \quad (1)$$

When detecting the edge, the photographed image analysis section 202 refers to each of pixel values from the central portion of the image toward the periphery thereof, and detects an edge based on a slope of the pixel values.

Figure 8A:
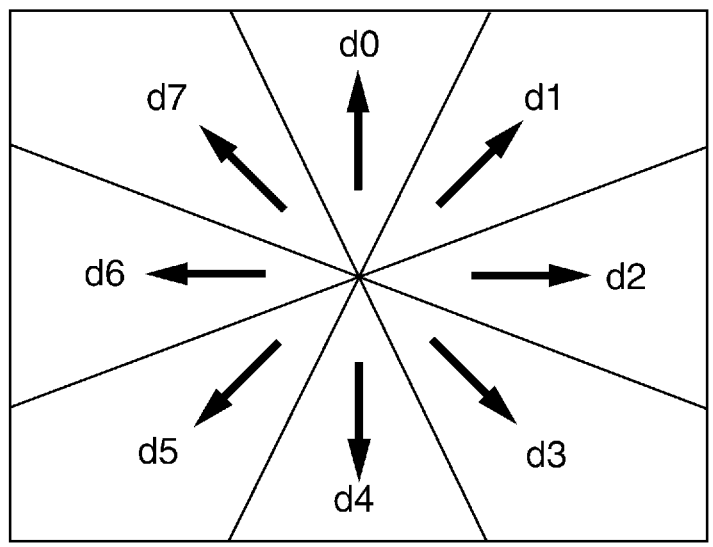
FIGS. 8A and 8B are diagrams useful in explaining detection of an edge, which is executed by the photographed image analysis section appearing in FIG. 2.
Figure 8B:
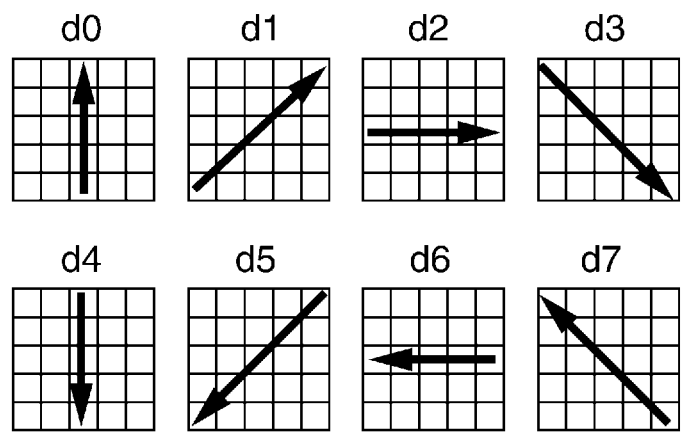

FIGS. 8A and 8B are diagrams useful in explaining detection of an edge, which is executed by the photographed image analysis section appearing in FIG. 2, in which FIG. 8A is a diagram showing an example of division of an image, and FIG. 8B is a diagram showing how pixel values are referred to.

For example, the photographed image analysis section 202 determines eight processing areas by equally dividing the image into portions extending in respective eight directions d0 to d7 starting from the center of the image (see FIG. 8A). Then, in each processing unit block, the photographed image analysis section 202 refers to pixel values, line by line, in one of the eight directions d0 to d7 including the vertical, horizontal and oblique directions (see FIG. 8B), depending on which processing area the processing unit block belongs to. The photographed image analysis section 202 determines an image area in which a difference between pixel values adjacent to each other on one line is not smaller than a predetermined threshold value, as an edge portion.

Then, as to a processing unit block including edge portions, the photographed image analysis section 202 refers to each of the R, G, and B plane data items, and detects color shift amounts of an R signal and a B signal with respect to a G signal. Next, while shifting the edge portion of the R or B plane data item, pixel by pixel, in an edge detecting direction of the processing area, the photographed image analysis section 202 acquires an SAD (Sum of Absolute Difference) as to signal values of the edge portions, which is the sum of the absolute values of differences between R or B signal values and G signal values of pixels at a plurality of corresponding positions. Then, the photographed image analysis section 202 detects a shift amount (the number of pixels shifted in one direction) at which the SAD becomes the smallest, as a color shift amount, and stores the color shift amount as the result of detection of the color shift amount in the local memory 206.

Note that when a value smaller than a color shift of one pixel is taken into account as a color shift amount, the value smaller than the color shift of one pixel, which provides a minimum value of the color shift amount, is estimated from immediately preceding and following values of a shift amount at which the SAD becomes the smallest, using parabola approximation.

FIG. 9 is a diagram showing an example of the result of detection of the color shift amount in each processing unit block, which is stored in the local memory 206 appearing in FIG. 2.

As shown in FIG. 9, when the step S305 is executed, as values of a column of the color shift amount (in units of pixels), values of the color shift amount are written in advance in the local memory 206. Although in the illustrated example, as the values of the color shift amount, values from −1.0 to +1.0 are written in the column of the color shift amount in increments of 0.1, actually, it is desirable to set values from −5.0 to +5.0 by taking into account color shift not smaller than one pixel.

Stored in a column of a section (a) are detection counts corresponding to respective numerical values of color shift amounts detected in processing unit blocks belonging to an image height-based divided section "a" shown in FIG. 5. Note that at the start of the step S305, "0" is written for all the detection counts in the column of the section (a). Further, whenever a color shift amount is detected in the processing unit blocks belonging to the image height-based divided section "a", a detection count associated with a numerical value of the detected color shift amount is incremented by 1.

Similarly, detection counts associated with color shift amounts detected in processing unit blocks belonging to image height-based divided sections "b" to "d", shown in FIG. 5, are stored in a column of a section (b) to a column of a section (d), respectively.

When the color shift detection processing in the processing unit blocks is completed for all the image height-based divided sections "a" to "d", the photographed image analysis section 202 calculates a total of detection counts associated with the color shift amounts for each of the image height-based divided sections "a" to "d", and calculates a total value of color shifts amounts by adding up the color shift amounts multiplied by the detection counts associated therewith, for each of the image height-based divided sections "a" to "d". Then, the photographed image analysis section 202 calculates average values of the color shift amounts detected in the respective image height-based divided sections based on the total values and the detection counts (also referred to as the "sample counts"), and stores these detection counts, total values, and average values, as second color shift amount data, in the local memory 206.

Next, a description will be given of a method of calculating a detection accuracy of a color shift amount on the above second color shift amount data.

A color shift amount detection accuracy (Rel) is calculated for each of the image height-based divided sections "a" to "d". The color shift amount detection accuracy is calculated based on a first weighting coefficient Kr with respect to a color shift amount change ratio, a second weighting coefficient Ks with respect to a color shift amount detection count, and a degree (Hensa) of variation of detected color shift amounts, by the following equation (2):

$$\text{Rel}=(Kr \times Ks)/\text{Hensa} \quad (2)$$

Figure 10A:
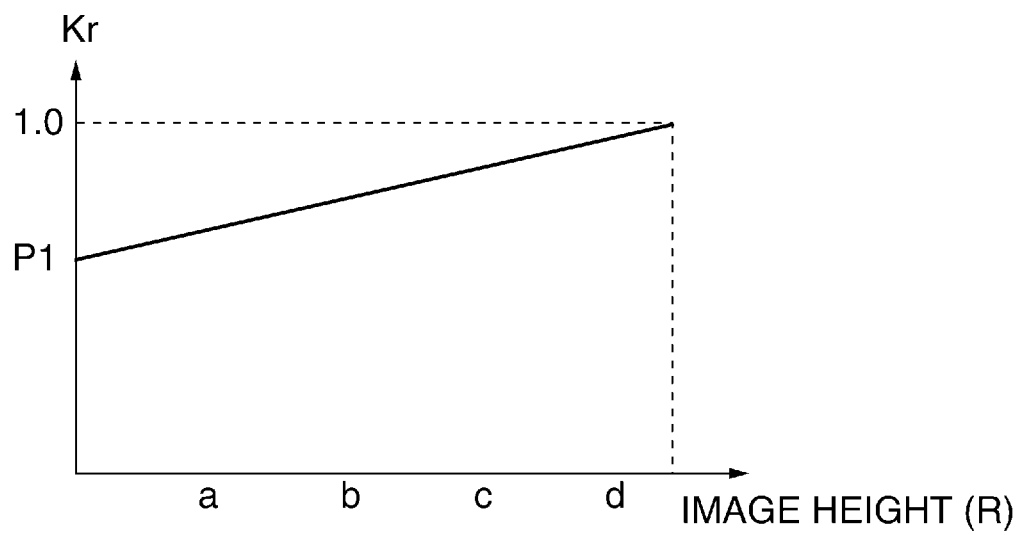
FIGS. 10A and 10B are diagrams useful in explaining weighting coefficients used for calculating a color shift detection accuracy.
Figure 10B:
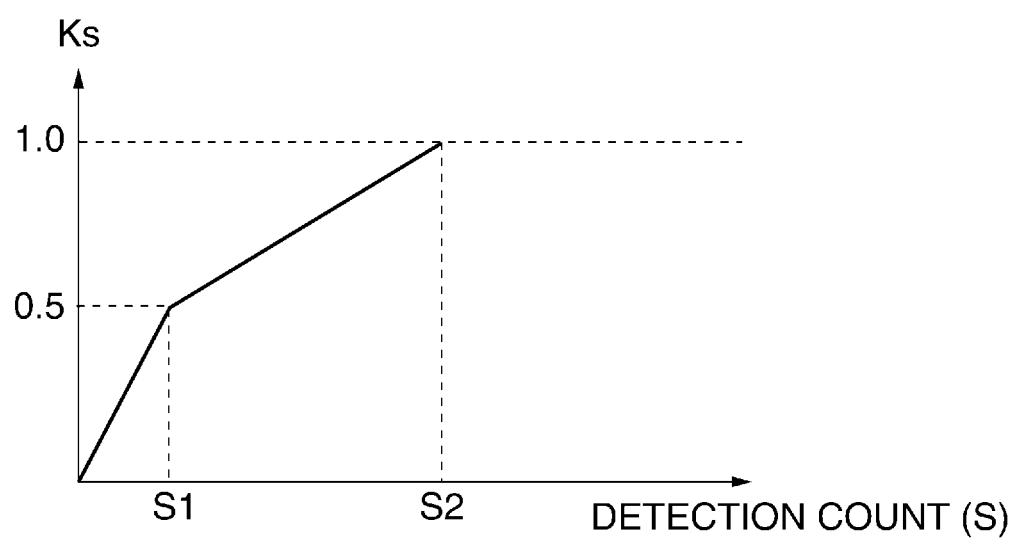

FIGS. 10A and 10B are diagrams useful in explaining weighting coefficients used for calculating the color shift amount detection accuracy, in which FIG. 10A is a diagram useful in explaining the first weighting coefficient Kr, and FIG. 10B is a diagram useful in explaining the second weighting coefficient Ks.

The first weighting coefficient Kr absorbs differences in the number of processing unit blocks and differences in the color shift amount change ratio between the image height-based divided sections "a" to "d". For example, as shown in FIG. 10A, in a central portion of the image in which the total number of processing unit blocks is small and changes in the color shift amounts are estimated to be small (area with a small image height, e.g. the image height-based divided section "a"), the first weighting coefficient Kr is set to a smaller value. This absorbs a difference of the central portion of the image in the reliability of detection accuracy from a peripheral portion (area with a large image height, e.g. the image height-based divided section "d") of the image.

As shown in FIGS. 10A and 10B, the first weighting coefficient Kr is linearly progressively increased from the central portion of the image toward the peripheral portion thereof, starting from a parameter (initial value) P1, and at an image end, the first weighting coefficient Kr=1.0 holds.

Further, when there is a large change ratio of the color shift amount from one image height to another due to the image angle of the photographing lens 101, an image height-dependent reliability difference is absorbed by changing the parameter (initial value) P1 according to the focal length.

The second weighting coefficient Ks is a coefficient for weighting the detection count of color shift amounts. When a color shift amount is detected using an edge, noise or the like is sometimes erroneously detected as an edge, and this erroneous detection causes erroneous detection of a color shift amount. Particularly when the detection count of color shift amounts is small, the erroneously detected color shift amount may have a large adverse effect on the detection accuracy of color shift amounts.

To cope with this, by using parameters S1 and S2 shown in FIG. 10B (i.e. first and second detection count threshold values S1 and S2, S2>S1), the second weighting coefficient Ks is changed according to the detection count of color shift amounts, to thereby reduce the influence of erroneous detection caused by noise.

As shown in FIG. 10B, the second weighting coefficient Ks is progressively increased starting from 0, according to the detection count of color shift amounts. A slope of increase in the second weighting coefficient Ks is made smaller at a parameter S1 and the second weighting coefficient Ks is made equal to 1.0 (Ks=1.0) at a parameter S2.

The degree of variation of color shift amounts (Hensa) indicates the standard deviation of results of detection of color shift amounts in each of the image height-based divided sections "a" to "d". In the example of the result of color shift amount detection shown in FIG. 9, assuming that K(n) represents a numerical value of each of possible color shift amounts of an image height-based divided section to which attention is being paid, Ka represents an average value of the color shift amount in the image height-based divided section, and S(n) represents a detection count of each color shift amount in the image height-based divided section, then, a dispersion $\sigma^2$ of the color shift amount in the target image height-based divided section to which attention is being paid is expressed by the following equation (3). By calculating a square root ($\sigma$) of the dispersion $\sigma^2$, it is possible to determine the standard deviation Hensa.

$$\sigma^2 = \sum_{n=1}^{N} [(K(n) - Ka)^2 \times S(n)] \quad (3)$$

The photographed image analysis section 202 calculates detection accuracy (Rel) in each of the image height-based divided sections "a" to "d", based on the first weighting coefficient Kr and the degree of variation (Hensa), determined as described above, by the above-mentioned equation (2), and stores the detection accuracy (Rel) in the local memory 206. If the value of the detection accuracy (Rel) is not smaller than 1, it is possible to determine that a reliable color shift amount has been detected.

Referring again to FIG. 3, after the analysis of the color shift amounts and the like has been performed as described above, the color shift amount correction section 203 compares between the detection accuracy of the first color shift amount data and that of the second color shift amount data stored in the local memory 206, under the control of the system controller 107. Then, the color shift amount correction section 203 newly generates third color shift amount data using color shift amounts higher in detection accuracy which are selected between the first and second color shift amount data (step S306: color shift amount correction), and stores the third color shift amount data in the local memory 206.

FIGS. 11A to 11C are diagrams useful in explaining color shift amount correction executed by the color shift amount correction section 203 appearing in FIG. 2, in which FIG. 11A is a diagram of an example of the first color shift amount data, FIG. 11B is a diagram of an example of the second color shift amount data, and FIG. 11C is a diagram of an example of the third color shift amount data.

Now, let it be assumed that the first color shift amount data shown in FIG. 11A and the second color shift amount data shown in FIG. 11B are stored in the local memory 206 (each data item includes detection accuracy). The color shift amount correction section 203 compares detection accuracy between the first and second color shift amount data items, and selects color shift amounts higher in detection accuracy.

When the first color shift amount data and the second color shift amount data are compared with each other, the first color shift amount data is higher in detection accuracy than the second color shift amount data in the image heights "a", "b", and "d". Therefore, the color shift amount correction section 203 selects the color shift amounts and detection accuracy of the first color shift amount data for the image heights "a", "b", and "d".

On the other hand, for the image height "c", the second color shift amount data is higher in detection accuracy than the first color shift amount data. Therefore, the color shift amount correction section 203 selects the color shift amount and detection accuracy of the second color shift amount data for the image height "c". Then, the color shift amount correction section 203 replaces the color shift amount of the first color shift amount data with the color shift amount, higher in detection accuracy, of the second color shift amount data, to thereby generate the third color shift amount data shown in FIG. 11C.

Then, under the control of the system controller 107, the correction value calculation section 204 generates a correction curve, based on the result of detection of the color shift amounts in the image height-based divided sections "a" to "d" (i.e. the third color shift amount data), by a quadratic or tertiary approximation (step S307: correction amount calculation).

Figure 12:
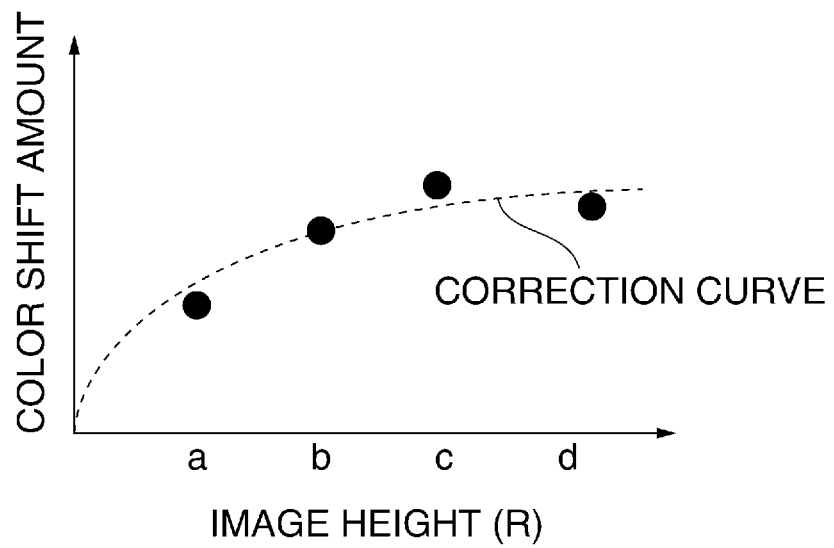
FIG. 12 is a diagram of an example of a correction curve calculated by a correction value calculation section appearing in FIG. 2.

FIG. 12 is a diagram of an example of the correction curve calculated by the correction value calculation section 204 appearing in FIG. 2.

As shown in FIG. 12, the correction value calculation section 204 plots color shift amounts according to the third color shift amount data for each of the image heights (a) to (d), and draws the correction curve according to the plotted color shift amounts, by the quadratic approximation.

Note that if the color shift amount detection accuracy in the image height-based divided sections "a" to "d" is lower than 1, it is impossible to determine an accurate correction curve, which causes so-called overcorrection in the color shift correction process. This sometimes leads to degradation of image quality. For this reason, no color shift correction is performed, when the detection accuracy is lower than 1 in all the image heights. Alternatively, when an average value of values of the color shift amount detection accuracy determined in all the image height-based divided sections "a" to "d" does not reach a threshold value, the color shift correction process may not be executed.

When detection accuracy higher than 1 is determined in a specific image height, calculation of color shift correction amounts (also referred to as "correction values") is performed using a quadratic or higher-order approximation obtained by curve fitting according to the number of image height-based divided sections high in detection accuracy, as disclosed in International Publication No. WO-2007-105359 (Japanese Patent Application No. 2008-504985). The thus calculated correction curve is stored in the local memory 206 as a correction value.

Next, the color shift correction section 205 corrects color shift of RAW image data read out from the RAM 110 using the correction curve, under the control of the system controller 107 (step S308). In correcting color shift, the phase of the R or B signal with respect to the G signal is shifted by a color shift amount therebetween, as disclosed in Japanese Patent Laid-Open Publication No. 2008-15946.

Figure 13:
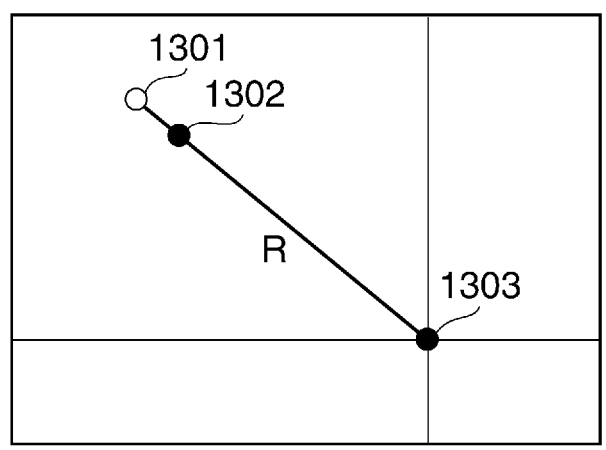
FIG. 13 is a diagram of an example of color shift correction executed by a color shift correction section appearing in FIG. 2.

FIG. 13 is a diagram of an example of the color shift correction executed by the color shift correction section 205 appearing in FIG. 2.

For example, to correct a target pixel 1302 away from an image center 1303 by an image height R, the color shift correction section 205 acquires a signal value from a pixel 1301 which is shifted from the target pixel 1302 by a color shift amount (k) in the image height R in the direction toward the periphery of the image. Then, the color shift correction section 205 executes the same processing on all the R and B signals in the Bayer array of the RAW image data, and corrects color shift caused in the RAW image data by the chromatic difference of magnification.

The RAW image data having the color shift therein corrected by the color shift correction section 205 is subjected to various types of image processing, such as the development processing and the noise reduction processing, by the system controller 107 and the image processor 108. After that, the RAW image data on which the color shift correction has been performed is subjected to data compression processing by the compression/expansion processor 111, and is stored in the memory card 118 via the card interface 116.

When the color shift correction is finished as described above, the system controller 107 controls the color shift amount correction section 203 to read out the third color shift amount data from the local memory 206 via the data read and rewrite section 201. Then, the system controller 107 stores this read-out third color shift amount data in the RAM 110 (step S309). That is, the system controller 107 performs processing for updating the first color shift amount data loaded into the RAM 110 to the third color shift amount data, and sets the third color shift amount correction data as the first color shift amount correction data anew.

After that, the system controller 107 determines whether or not the power of the camera 100 has been turned off (OFF) (step S310). If the power of the camera 100 has not been turned off (NO to the step S310), the system controller 107 returns to the step S302, and determines whether or not the shutter button 112 has been half pressed.

On the other hand, if the power of the camera 100 has been turned off (YES to the step S310), the system controller 107 writes and stores the first color shift amount data having been updated (i.e. the third color shift amount data) in the RAM 110 over a color shift amount data area of the ROM 109 (step S311), followed by terminating photographing.

As described above, in the first embodiment of the present invention, color shift amount data stored in the ROM 109 is updated by accurate color shift amount data detected from an image. This makes it possible to absorb differences in color shift amount caused by differences between individual cameras 100, to thereby accurately perform color shift correction. In short, in the first embodiment of the present invention, it is possible to accurately detect and correct color shift caused by the chromatic difference of magnification without depending on a photographed image, and what is more, taking differences between individual cameras 100 into account.

Next, a description will be given of an example of a camera as an image pickup apparatus including an image processing apparatus according to a second embodiment of the present invention. Note that the camera as the image pickup apparatus including the image processing apparatus according to the second embodiment has the same hardware configuration as that of the camera shown in FIG. 1.

Although in the above-described first embodiment, the description has been given of the case where color shift is corrected by storing first color shift amount data determined from a photographed image (past image) in the ROM 109, this is not limitative, but color shift amount data determined according to a lens design value (hereinafter referred to as "color shift amount design value data") may be stored in the ROM 109.

In this case, in the step S301 appearing in FIG. 3, the system controller 107 reads out the color shift amount design value data from the ROM 109 together with the first color shift amount data, and loads the data items into the RAM 110. Here, it is assumed that the detection accuracy of the color shift amount design value data is set to 1 in all the image height-based divided sections.

In the step S303, the photographed image analysis section 202 reads out first color shift amount data and color shift amount design value data associated with photographing information into the local memory 206. Then, in the step S305, the photographed image analysis section 202 analyzes the photographed image, and calculates second color shift amount data, as described hereinabove.

In the step S306, to correct color shift, there is a case where the detection accuracy of the first color shift amount data and that of the second color shift amount data are smaller than 1 (here, 1 is a detection threshold value). In such a case, the color shift amount correction section 203 sets corresponding color shift amount design value data stored in the local memory 206 as third color shift amount data.

This makes it possible to perform the color shift correction using the color shift amount design value data even in a state of the camera 100 in which the color shift detection accuracy is not high immediately after starting the camera 100.

Next, a description will be given of an example of a camera as an image pickup apparatus including an image processing apparatus according to a third embodiment of the present invention. Note that the camera as the image pickup apparatus including the image processing apparatus according to the third embodiment has the same hardware configuration as that of the camera shown in FIG. 1. In the third embodiment, a color shift amount and detection accuracy are managed according to a combination of the lens ID, the focal length, the photographing distance of the photographing lens 101, and a shift amount of the optical center of the camera 100 caused by camera shake correction.

In the third embodiment, the color shift amount and the color shift detection accuracy are separately stored in respective image areas designated in advance. When the optical center of the camera 100 is displaced from the center of an image due to a difference between individual cameras 100 or camera shake correction, a difference between color shift amounts is sometimes caused in the corners of the image. In such a case, when color shift correction is performed using a correction curve calculated from an average value of the color shift amounts, degradation of image quality caused by overcorrection of color shift may become conspicuous.

Figure 14A:
FIGS. 14A and 14B are diagrams which are useful in explaining storage of color shift amount data and detection accuracy, which is executed by a digital camera as an image pickup apparatus including an image processing apparatus according to a third embodiment of the present invention.
Figure 14B:
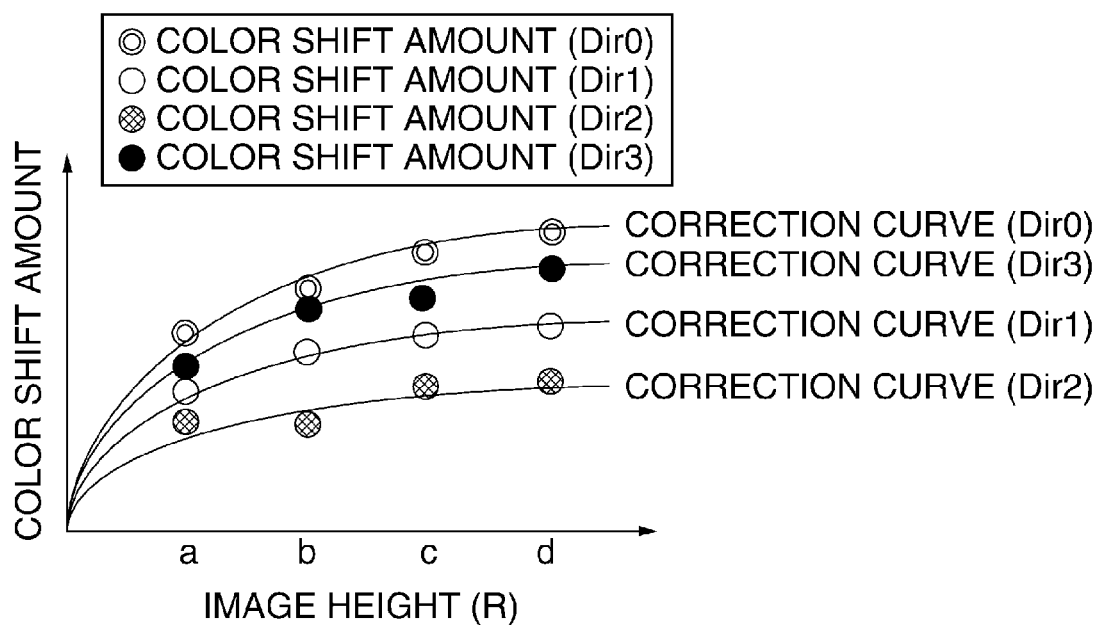

FIGS. 14A and 14B are diagrams which are useful in explaining storage of color shift amount data and detection accuracy of color shift amounts, which is executed by the camera according to the third embodiment, in which FIG. 14A is a diagram of image areas designated in advance in a photographed image, and FIG. 14B is a diagram of correction curves calculated on an image area basis.

The photographed image analysis section 202 divides the photographed image (RAW image data) into the image areas designated in advance (see FIG. 14A). In the illustrated example, the photographed image analysis section 202 uniformly divides the photographed image into four image areas of Dir0 to Dir3. Then, the photographed image analysis section 202 calculates a color shift amount and detection accuracy on an image area basis, and stores them in a local memory 206 in a manner associated with the image areas. If a color shift amount and detection accuracy are stored on an image area basis (on a quadrant basis in the illustrated example) as described above, it is possible to perform accurate color shift correction by taking into account variation in color shift between the quadrants.

Note that the color shift correction process in the third embodiment is the same as the process in the flowchart described with reference to FIG. 3. However, in the third embodiment, in the analysis of the color shift amount described in the step S305, the photographed image analysis section 202 sums detection results of the color shift amounts in the respective image areas Dir0 to Dir3, and stores second color shift amount data in the local memory 206 in association with the image areas.

Then, in the correction of the color shift amount and the calculation of the correction amount in the steps S306 and S307, respectively, processing is performed on the second color shift amount data stored in the local memory 206 in association with the image areas, and correction curves are calculated on an image area basis (see FIG. 14B). Further, in the color shift correction described in the step S308, the color shift correction section 205 refers to the correction curves calculated on an image area basis, according to each image area, and performs the color shift correction.

After termination of the color shift correction, in the step S309, the system controller 107 updates the image area-by-image area first color shift amount data loaded in the RAM 110 using the image area-by-image area third color shift amount data stored in the local memory 206. Then, in the step S311, the system controller 107 updates the image area-by-image area first color shift amount data stored in the ROM 109 using the image area-by-image area first color shift amount data stored in the RAM 110 (i.e. the third color shift amount data, in this example).

Next, a description will be given of an example of a camera as an image pickup apparatus including an image processing apparatus according to a fourth embodiment of the present invention. Note that the camera as the image pickup apparatus including the image processing apparatus according to the fourth embodiment has the same hardware configuration as that of the camera shown in FIG. 1.

In the above described first embodiment, when the detection accuracy of color shift amounts detected from the photographed image exceeds the detection accuracy of color shift amounts detected from a past image, color shift amount data is updated. On the other hand, in the fourth embodiment, the results of detection of color shift amounts detected from the photographed image are accumulated, to thereby efficiently improve detection accuracy. Note that the color shift detection and correction process in the fourth embodiment is the same as the process in the flowchart described with reference to FIG. 3.

However, in the fourth embodiment, in the analysis of the color shift amount described in the step S305, the processing unit block-by-processing unit block color shift amount and sample count (see FIG. 9) temporarily stored in the local memory 206 are stored in the RAM 110 under the control of the system controller 107. Whenever the color shift amount of the photographed image is analyzed, the color shift amount correction section 203 reads out the color shift amount and the sample count from the RAM 110, and adds the result of the analysis (i.e. the result of detection) to the color shift amount and the sample count. Then, the color shift amount correction section 203 calculates an average value of the color shift amount and the standard deviation of the results of detection of the color shift amount again. This makes it possible to efficiently improve detection accuracy in the fourth embodiment.

Next, a description will be given of an example of a camera as an image pickup apparatus including an image processing apparatus according to a fifth embodiment of the present invention. Note that the camera as the image pickup apparatus including the image processing apparatus according to the fifth embodiment has the same hardware configuration as that of the camera shown in FIG. 1.

In the above-described second embodiment, the description has been given of the case where in performing color shift amount correction, when the detection accuracy of the first color shift amount data and that of the second color shift amount data are smaller than 1, color shift is corrected using the color shift amount design value data as the third color shift amount data.

However, in the fifth embodiment, the color shift amount design value data is corrected using the result of detection of a color shift amount detected from a photographed image. Note that the color shift detection and correction process in the fifth embodiment is the same as the process in the flowchart described with reference to FIG. 3.

FIG. 15 is a diagram useful in explaining color shift amount design value data used in a camera according to the fifth embodiment of the present invention.

In the fifth embodiment, when the color shift amount analysis process is started, described in the step S305 shown in FIG. 3, the photographed image analysis section 202 stores the color shift amount design value data shown in FIG. 15 in the local memory 206 as color shift amount summation initial data. In the color shift amount summation initial data, the number of all the processing unit blocks in each of the image height-based divided sections "a" to "d" is set as a detection count associated with a color shift amount determined from the lens design values. In FIG. 15, the detection count indicates the number of the processing unit blocks in each of the image height-based divided sections "a" to "d", the total value indicates the product of the number of the processing unit blocks and the color shift amount calculated from the lens design values, and the average value indicates the color shift amount calculated from the lens design values.

In the step S305 and the subsequent steps, as described in the fourth embodiment, the color shift amounts detected from the photographed image are reflected on the color shift amount summation initial data, as the results of detection in the image height-based divided sections "a" to "d". When the analysis of the color shift amounts in all the processing unit blocks is terminated, the detection counts and total values shown in FIG. 15 are calculated again.

This makes it possible to determine a color shift amount calculated by averaging the color shift amount summation initial data calculated from the lens design values and the color shift amount data detected from the photographed image.

By using the color shift amount analysis (i.e. color shift amount detection) process described in the fifth embodiment, even when a camera with low detection accuracy starts to be used, it is possible to accurately correct color shift using the color shift amount design value data. Moreover, it is possible to efficiently enhance the accuracy of correction of variation in color shift amount due to differences between individual cameras.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-172254 filed Aug. 22, 2013 which is hereby incorporated by reference herein in its entirety.

What is claimed is:

1. An image processing apparatus configured to correct color shift caused by chromatic difference of magnification in image data determined based on an optical image incident through an optical system, comprising:
a storage unit configured to store first color shift amount data including color shift amount information of the image data and accuracy information indicative of detection accuracy of the color shift;
an analysis unit configured to analyze the image data and thereby determine second color shift amount data including color shift amount information of the image data and accuracy information indicative of detection accuracy of the color shift;
a correction unit configured to correct the color shift of the image data using color shift amount information selected from the first color shift amount data and the second color shift amount data, based on the accuracy information included in the first color shift amount data read out from the storage unit and the accuracy information included in the second color shift amount data determined by the analysis unit; and
an update unit configured to update the first color shift amount data stored in the storage unit with a third color shift amount data, which is the color shift amount information selected by said correction unit.

2. The image processing apparatus according to claim 1, wherein the analysis unit is configured to determine a color shift amount and the accuracy information for each image height of the image data.

3. The image processing apparatus according to claim 1, wherein the analysis unit is configured to divide the image data into a plurality of processing unit blocks and determine a color shift amount and the accuracy information for each of the processing unit blocks.

4. The image processing apparatus according to claim 2, wherein the analysis unit is configured to determine the accuracy information according to the number of processing unit blocks that include edges, and standard deviation of the color shift amount.

5. The image processing apparatus according to claim 1, wherein the update unit is configured to compare the detection accuracy of the first color shift amount data and the detection accuracy of the second color shift amount data, and update the first color shift amount data while setting information of a color shift amount higher in detection accuracy as the third color shift amount data.

6. The image processing apparatus according to claim 5, wherein the detection accuracy is determined based on a sample count of the color shift amount information.

7. The image processing apparatus according to claim 1, wherein the update unit is configured to generate the third color shift amount data by averaging the color shift amounts of the first color shift amount data and the second color shift amount data.

8. The image processing apparatus according to claim 1, wherein the analysis unit is configured to determine the color shift amount and the detection accuracy, for each of a plurality of image areas determined by dividing the image data, using a center of the image data as a starting point, and set an average value of the color shift amount and an average value of the detection accuracy as the second color shift amount data.

9. The image processing apparatus according to claim 1, wherein the storage unit is configured to store color shift amount data determined according to design values based on which the optical system has been designed, as color shift amount design value data, and store the first color shift amount data, and
wherein the update unit is configured to set the color shift amount design value data as the third color shift amount data in a case where the detection accuracy of the first color shift amount data and the detection accuracy of the second color shift amount data are smaller than a predetermined detection threshold value.

10. An image processing apparatus configured to correct color shift caused by chromatic difference of magnification in image data determined based on an optical image incident through an optical system, comprising:
a storage unit configured to store first color shift amount data including color shift amount information of the image data and accuracy information indicative of detection accuracy of the color shift;
an acquisition unit configured to acquire the first color shift amount data from the storage unit;
an analysis unit configured to analyze the image data and thereby determine second color shift amount data including color shift amount information of the image data and accuracy information indicative of detection accuracy of the color shift; and
a correction unit configured to correct the color shift of the image data using the color shift amount information selected from the first color shift amount data and the second color shift amount data, based on the accuracy information included in the first color shift amount data acquired from the storage unit by the acquisition unit and the accuracy information included in the second color shift amount data determined by the analysis unit,
wherein the storage unit is configured to store a plurality of sets of first color shift amount data each associated with a focal length of the optical system and a photographing distance indicative of a distance to an object which is focused, and
wherein the acquisition unit is configured to acquire the first color shift amount data from the storage unit according to photographing information during photographing of the image data.

11. A method of controlling an image processing apparatus configured to correct color shift caused by chromatic difference of magnification in image data determined based on an optical image incident through an optical system, comprising:
storing first color shift amount data including color shift amount information of the image data and accuracy information indicative of detection accuracy of the color shift;
analyzing the image data and thereby determining second color shift amount data including color shift amount information of the image data and accuracy information indicative of detection accuracy of the color shift;
correcting the color shift of the image data using the color shift amount information selected from the first color shift amount data and the second color shift amount data, based on the accuracy information included in the first color shift amount data and the accuracy information included in the determined second color shift amount data; and
updating the stored first color shift amount data with a third color shift amount data, which is the selected color shift amount information.

12. A non-transitory computer-readable storage medium storing a computer-executable control program for causing a computer to execute a method of controlling an image processing apparatus configured to correct color shift caused by chromatic difference of magnification in image data determined based on an optical image incident through an optical system,
wherein the method comprises:
storing first color shift amount data including color shift amount information of the image data and accuracy information indicative of detection accuracy of the color shift;
analyzing the image data and thereby determining second color shift amount data including color shift amount information of the image data and accuracy information indicative of detection accuracy of the color shift;
correcting the color shift of the image data using the color shift amount information selected from the first color shift amount data and the second color shift amount data, based on the accuracy information included in the first color shift amount data and the accuracy information included in the determined second color shift amount data; and
updating the stored first color shift amount data with a third color shift amount data, which is the selected color shift amount information.

13. A method of controlling an image processing apparatus configured to correct color shift caused by chromatic difference of magnification in image data determined based on an optical image incident through an optical system, comprising:
storing first color shift amount data including color shift amount information of the image data and accuracy information indicative of detection accuracy of the color shift;
acquiring the stored first color shift amount data;
analyzing the image data and thereby determining second color shift amount data including color shift amount information of the image data and accuracy information indicative of detection accuracy of the color shift; and
correcting the color shift of the image data using the color shift amount information selected from the first color shift amount data and the second color shift amount data, based on the accuracy information included in the first color shift amount data and the accuracy information included in the determined second color shift amount data, wherein storing first color shift amount data includes storing a plurality of sets of first color shift amount data each associated with a focal length of the optical system and a photographing distance indicative of a distance of an object which is focused, each first color shift amount data including color shift amount information of the image data and accuracy information indicative of detection accuracy of the color shift, and wherein acquiring the stored first color shift amount data includes acquiring the stored first color shift amount data according to photographing information during photographing of the image data.

14. A non-transitory computer-readable storage medium storing a computer-executable control program for causing a computer to execute a method of controlling an image processing apparatus configured to correct color shift caused by chromatic difference of magnification in image data determined based on an optical image incident through an optical system, wherein the method comprises:

storing first color shift amount data including color shift amount information of the image data and accuracy information indicative of detection accuracy of the color shift;

acquiring the stored first color shift amount data;

analyzing the image data and thereby determining second color shift amount data including color shift amount information of the image data and accuracy information indicative of detection accuracy of the color shift; and correcting the color shift of the image data using the color shift amount information selected from the first color shift amount data and the second color shift amount data, based on the accuracy information included in the first color shift amount data and the accuracy information included in the determined second color shift amount data, wherein storing first color shift amount data includes storing a plurality of sets of first color shift amount data each associated with a focal length of the optical system and a photographing distance indicative of a distance of an object which is focused, each first color shift amount data including color shift amount information of the image data and accuracy information indicative of detection accuracy of the color shift, and wherein acquiring the stored first color shift amount data includes acquiring the stored first color shift amount data according to photographing information during photographing of the image data.

15. An image processing apparatus configured to correct color shift caused by chromatic difference of magnification in image data determined based on an optical image incident through an optical system, comprising:

a storage configured to store first color shift amount data including color shift amount information of the image data and accuracy information indicative of detection accuracy of the color shift; and a processor connected to the storage and configured to execute instructions that, when executed, cause the image processing apparatus to:

analyze the image data and thereby determine second color shift amount data including color shift amount information of the image data and accuracy information indicative of detection accuracy of the color shift;

correct the color shift of the image data using color shift amount information selected from the first color shift amount data and the second color shift amount data, based on the accuracy information included in the first color shift amount data read out from the storage and the accuracy information included in the determined second color shift amount data; and update the first color shift amount data stored in the storage with a third color shift amount data, which is the selected color shift amount information.

16. An image processing apparatus configured to correct color shift caused by chromatic difference of magnification in image data determined based on an optical image incident through an optical system, comprising:

a storage configured to store first color shift amount data including color shift amount information of the image data and accuracy information indicative of detection accuracy of the color shift; and a processor connected to the storage and configured to execute instructions that, when executed, cause the image processing apparatus to:

acquire the first color shift amount data from the storage;

analyze the image data and thereby determine second color shift amount data including color shift amount information of the image data and accuracy information indicative of detection accuracy of the color shift; and correct the color shift of the image data using the color shift amount information selected from the first color shift amount data and the second color shift amount data, based on the accuracy information included in the first color shift amount data acquired from the storage and the accuracy information included in the determined second color shift amount data, wherein the storage is configured to store a plurality of sets of first color shift amount data each associated with a focal length of the optical system and a photographing distance indicative of a distance to an object which is focused, and wherein the first color shift amount data is acquired from the storage according to photographing information during photographing of the image data.

* * * * *